May 21, 1968  M. MOIRIAT ET AL  3,384,390
HEAVY DUTY TRAILER AND TRACTOR HITCH
Filed Aug. 22, 1966  4 Sheets-Sheet 1
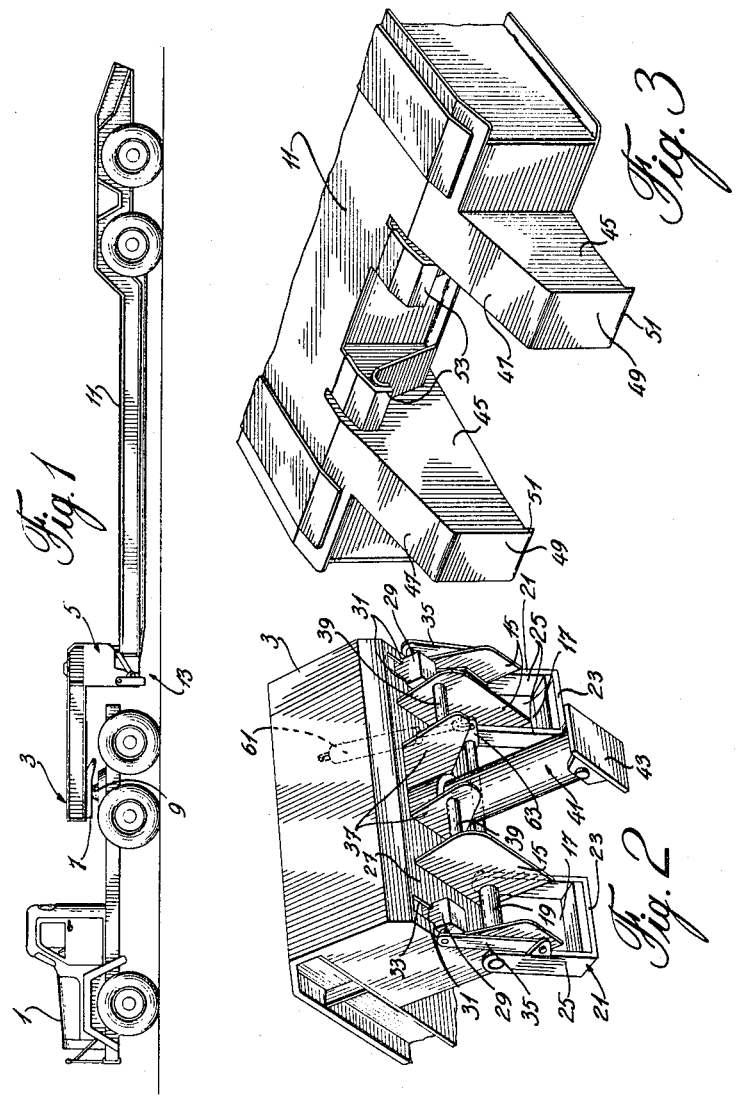
INVENTORS
Maurice MOIRIAT
Albert TREHOUT
BY
ATTORNEY

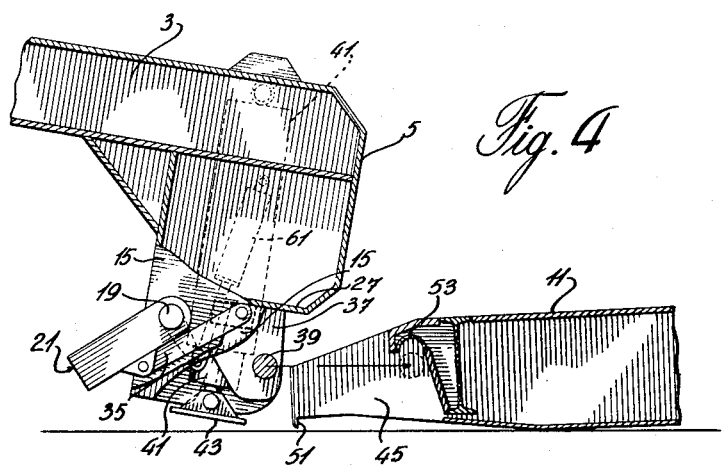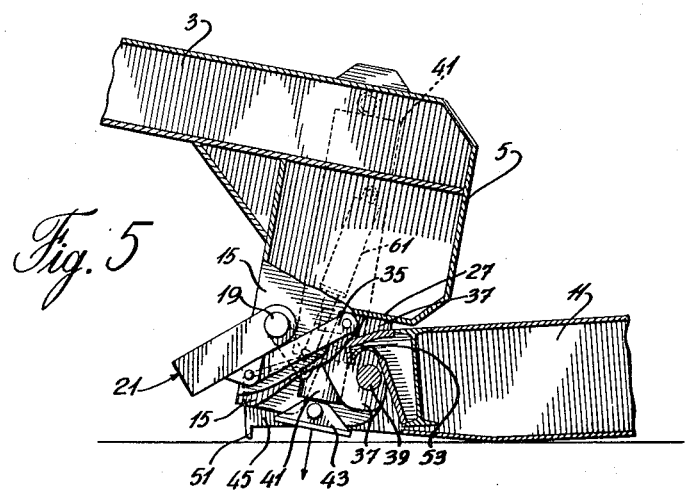

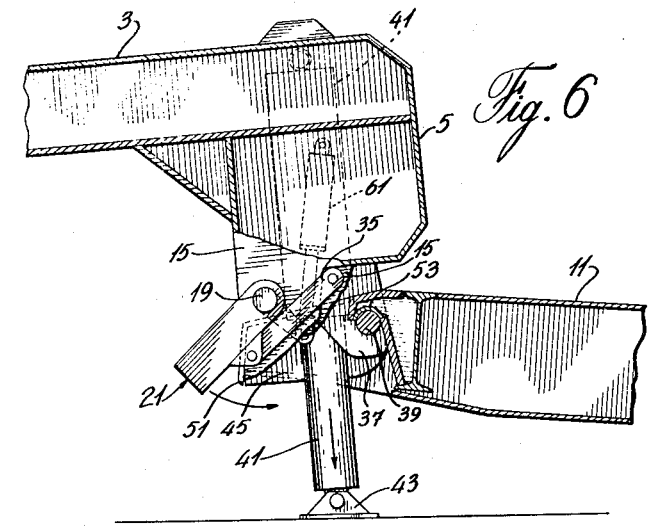
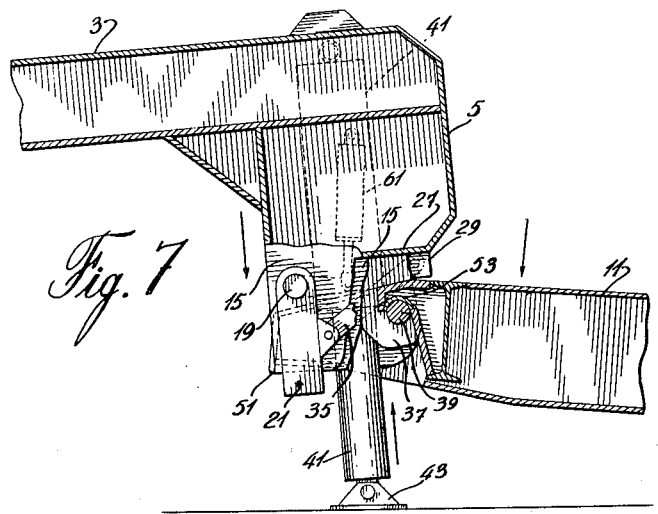

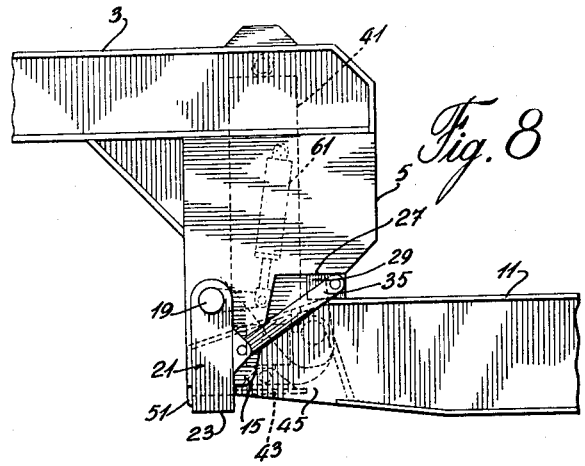
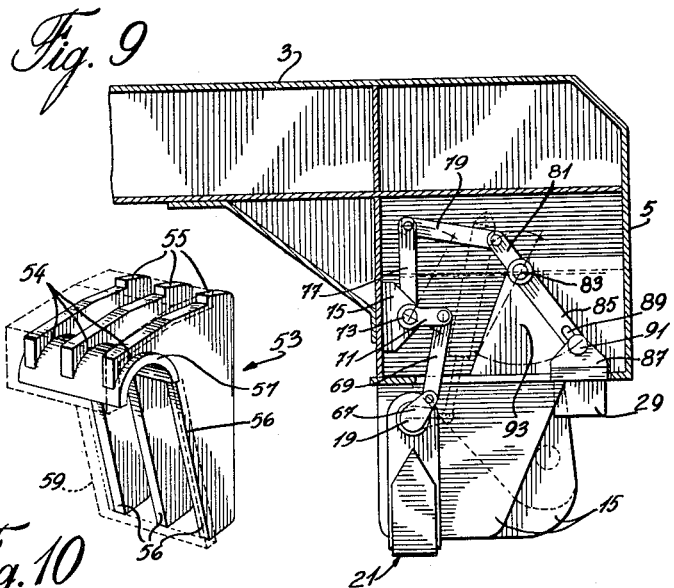

United States Patent Office 3,384,390
Patented May 21, 1968

3,384,390
HEAVY DUTY TRAILER AND TRACTOR HITCH
Maurice Moiriat, Montreal, Quebec, and Albert Trehout, City Jacques Cartier, Quebec, Canada, assignors to Gaymor Trailers Limited, Chemin Chambly, St-Hubert, Quebec, Canada
Filed Aug. 22, 1966, Ser. No. 574,042
Claims priority, application Canada, Aug. 24, 1965, 939,036
8 Claims. (Cl. 280—423)

ABSTRACT OF THE DISCLOSURE

A hitch for connecting a forward tractor and a rearward trailer. The tractor has a hitch member including a gooseneck at the rear end thereof. The forward end of the trailer and the lower end of the gooseneck are coupled together by means of a complementary coupling means. The complementary coupling means comprises a longitudinal projection at the forward end of the trailer and an open-bottom guiding channel at the lower end of the gooseneck for the purpose of guiding the trailer projection during the operation of hitching the gooseneck and the trailer. In addition, the coupling means comprises complementary interlocking and pivoting means at the lower end of the gooseneck and at the front end of the trailer for allowing interlocking when raising the gooseneck and the trailer and for allowing relative pivoting of the gooseneck and the trailer, when interlocked, about a transverse axis across the rear of the channel and of the projections. The projections have supporting members mounted on the gooseneck. These supporting members are movable in and out of position across the open-bottoms of the guiding channel. Moreover, the coupling means is provided with power operated ground engaging hoist means mounted to lift and lower the gooseneck.

---

The present invention relates to improvements in a hitch for connecting a trailer and a tractor and more specifically to a coupling means between a gooseneck provided at the rear end of the tractor to the front end of a semi-trailer of the type having a low bed.

The main object of the invention resides in the provision of a simplified hitch assembly or coupling means capable of fully automatically coupling the gooseneck of a tractor to a semi-trailer and also automatically securely locking the coupling means.

Another object of the invention lies in the provision of such a coupling means wherein the gooseneck coupling part can be suitably guided in the trailer coupling part and the coupling operation carried on whether the front end of the trailer lies on the ground or rests on supporting blocks.

These objects of the invention may be obtained in a hitch according to the invention used for connecting a forward tractor and a rearward trailer together wherein the tractor has a hitch member including a gooseneck at the rear end thereof and complementary coupling means at the lower end of the gooseneck and at the forward end of the trailer for coupling the gooseneck and trailer together, the coupling means comprising: a longitudinal projection at the forward end of the trailer; an open-bottom guiding channel at the lower end of the gooseneck for guiding of the trailer projection during hitching of said gooseneck and trailer; complementary interlocking and pivoting means at the gooseneck lower end and the trailer front end allowing interlocking upon raising of the gooseneck and trailer and relative pivoting of the gooseneck and the trailer, when interlocked, about a transverse axis across the rear of said channel and of said projection; a supporting member for said projection mounted on said gooseneck and movable in and out of position across the open bottom of said guiding channel, and power operated ground engaging hoist means mounted to lift and lower the gooseneck, whereby said projection is first guided into said channel and said interlocking means engaged upon said hoist means raising said gooseneck while the projection is pivoted inside said channel, said supporting member is moved across the open bottom of said channel and said hoist means then lowers said gooseneck to force said projection to sit on said supporting member.

In the preferred form of the invention, the supporting member is the shoe of a stirrup member the lateral straps of which are pivotally mounted on parallel cheek plates depending from the gooseneck and defining said channel. Furthermore, the projection at the forward end of the trailer is formed at the free end thereof with a downwardly protruding ledge serving to prevent disengagement of the projection from the gooseneck by abutting the aforesaid supporting member.

It is believed that a better understanding of the invention will be afforded by the description that follows of a specific embodiment of the invention having reference to the appended drawing wherein:

FIG. 1 is a side elevation view of a tractor-trailer combination provided with the coupling means of the invention;

FIG. 2 is a perspective view of the coupling part of the gooseneck;

FIG. 3 is a perspective view of the coupling part of the trailer;

FIGS. 4, 5, 6, 7 and 8 are side elevation views, partly in cross-section, illustrating the various steps of the coupling operation of the coupling means;

FIG. 9 is a side elevation view, partly in cross section, of the gooseneck and illustrating another embodiment of the linking connection between the supporting stirrup and the filler block;

FIG. 10 is a perspective view of the inner structure of the hook part of the complementary interlocking and pivoting means.

In this specification and in the claims, the terms "front," "rear" and related adjectives, are to be taken in relation to the tractor which is the forward part of the combination and the trailer which is the rearward part thereof.

The coupling means of the invention is for mounting on a tractor-trailer combination as illustrated in FIG. 1 and comprising a tractor 1 having the usual hitch member 3 provided at the rear end thereof with a gooseneck 5. In known manner, the hitch member 3 is mounted on a conventional fifth wheel structure 7 for pivoting about a vertical axis, the fifth wheel sitting on a support 9 for rocking of the gooseneck about a horizontal axis transverse to the tractor. Thus, hitch member 3 can rotate about a vertical axis as well as pivot in a vertical plane.

A conventional heavy-duty low center of gravity trailer 11 is hooked on the gooseneck 5 through the coupling means 13 of the invention, more specifically illustrated in the remaining figures, particularly FIGS. 2 and 3 to which reference is now made.

Gooseneck 5 has a series of cheek plates 15 depending from the lower surface thereof and defining therebetween channels 17. Near the rear end of channels 17 is an axle 19 traversing all cheek plates 15 and intended for the support of stirrup members 21 each formed of a supporting shoe 23 and a pair of lateral supporting straps 25, the free end of the latter being mounted on axle 19. The assembly of stirrup members 21 and axle 19 is such as to allow pivoting of the shoes 23 or supporting members in and out of position across the open bottom of guiding channels 17 as best illustrated in FIGS. 6 and 7.

With particular reference to FIGS. 4 to 8, the rearward lower end of gooseneck 23 defines a nose portion 27. A pair of filler blocks 29 are mounted so as to slide longitudinally of the gooseneck beneath the nose portion 27. This may be done in any convenient manner such as by providing suitable grooves 31 on two opposite sides of the blocks, said grooves adapted to receive the opposed edges of slots 33 provided through the bottom plate of the gooseneck 3. Connecting links 35 join each block 29 to its corresponding stirrup 21 as by being pivoted, at the ends thereof, to both.

A pair of brackets 37 depend downwardly from nose portion 27 and at the rear end thereof, or the rear end of channels 17, there are provided coupling pins 39 secured to both plates 37 and the adjacent plates 15.

It should particularly be noted, with reference to FIG. 4, that axle 19 of the stirrup members 21 lie forwardly of end pins 39 rearwardly of gooseneck 3 in relation to the longitudinal direction of the tractor-trailer combination.

A power operated ground engaging hoist means in the preferred form of a hydraulic piston 41 is mounted centrally of gooseneck 3 to project from the lower face thereof and has a ground-engaging pedestal 43 pivoted at the lower end thereof to be set on the ground.

The coupling means of the trailer 11 comprises a pair of projections 45 longitudinally extending from the main body of tractor 11. Each projection has a downwardly inclined upper face 47 and a front face 49 extending beyond the lower surface of the projection in the form of a ledge 51.

Projections 45 are spaced across the width of trailer 11 in such a way as to be guided into the previously described channels 17 of the coupling part of gooseneck 3.

Rearwardly of projections 45 are the other part of the interlocking and pivoting means previously mentioned in the form of downwardly oriented coupling hooks 53 intended, as will be understood, to straddle the coupling pins 39 of the other coupling part. As shown in FIG. 10, each coupling hook 53 is preferably formed of a series of parallel plates 55 having corresponding edges thereof cut into the shape of a hook defined by an arcuate upper portion 54 and a downwardly inclined straight portion 56. The arcuate portions 54 of the plates are interconnected by a half-circular plate 57 while the downwardly inclined parts 56 are covered by a straight flat plate 59. The upper portions may be covered by other strengthening plates, as shown in dotted lines.

Referring back again to FIG. 2, axle 19 is brought into rotation by means of a hydraulic piston 61 having the piston rod thereof pivotally mounted at one end to the end of a link 63, the other end of which is secured to the axle 19. In this manner, it will be understood that actuation of piston 61 (which incidentally is independent from the actuation of piston 41) will cause rotation of axle 19 and rocking of stirrup members 21 in and out of position across the open bottom of channels 17 and also sliding of filler blocks 29 through the action of the connecting links 35.

Operation of the coupling means of the invention will now be described in connection with FIGS. 4 through 8.

In FIG. 4, gooseneck 3 has been pivoted downwardly and tractor 1 backs up to cause engagement of the two coupling parts, care being taken that projections 45 be in alignment with the corresponding channels 17. From this figure, it will be noted that hooks 53 should stand as close as possible near the top surface of float or trailer 11 or their spatial relation with coupling pins 39 should be such that the gooseneck will not touch ground during engagement of the coupling parts as clearly illustrated in FIG. 5. In that figure also, it will be noted that stirrup members 21 have been moved out from across the corresponding channels 17.

In FIG. 5, the gooseneck 5 has been brought closer to trailer 11 and with the coupling pins 39 immediately beneath the coupling hooks 53. In that position, the nose portion 27 lies close to the top surface of float or trailer 11.

The piston rod of hydraulic piston 41 is then brought down until the pedestal 43 settles on the ground at which time the piston cylinder and the gooseneck start to rise until interlocking engagement of the coupling pins 39 and the coupling hooks 53. Thereafter, both the gooseneck 5 and trailer 11 move upwardly together. During that movement, coupling pins 39 become pivoting pins for float 11 and projections 45 which thus pivot inside channels 17 right up to the position shown in FIG. 6. At that moment, piston 61 is actuated causing pivoting of axle 19 and rocking of stirrup members 21 to bring the supporting shoe 23 thereof beneath projections 45. This is the situation of FIG. 7. From thereon, the pressure in piston 41 is released causing the gooseneck 5 and the float 11 to fall until the lower surface of projections 45 rests on the shoes of stirrup members 21. This is then the situation of FIG. 8. It will be noted here that the ledges 51 at the front end of projections 45 lie forwardly of the shoes 23 of the stirrup members 21 to prevent accidental withdrawal of the float from the stirrup members. Such a tendency will also be countered the very weight of the trailer 11.

Simultaneously with the rocking movement of stirrup members 21, the filler blocks 29 are moved rearwardly (FIGS. 7 and 8) to occupy and fill the space between the jutting nose portion 27 of gooseneck 5 and the top surface of trailer 11. Blocks 29 serve to prevent any undue upward movement of float 11 relative to gooseneck 5.

The fact that connecting links 35 between the stirrup members 21 and the blocks 29 lie outside gooseneck 5 may be found objectionable and FIG. 9 is an improved system that will allow the linking to take place mostly within the gooseneck. This may be accomplished by having, for each stirrup member, a short link 67 mounted directly on shaft 19 and pivotally connected at the free end thereof to a first arm 69 located mostly inside gooseneck 5. The free end of this first arm 69 is pivotally connected at one end of a short rod 71 the latter being secured on a short shaft 73 pivotally mounted on a bracket 75 secured to one wall of gooseneck 5. A second arm 77 is fixed to shaft 73 and a lever 79 has one end pivoted to the other end of the second arm 77 while the other end is pivotally connected to one end of a third arm 81, the latter being fixed to a pivoting pin 83 on an upstanding bracket 93 fixed to the structure of gooseneck 5. To this same pin 83 is fixed a fourth arm 85 having at one end an elongated slot 89 engageable around a follower pin 91 provided at the top of an upstanding plate 87 secured to the corresponding block 29.

It will be understood that rotation of axle 19 will, through the described linkage mechanism, bring sliding of blocks 29 longitudinally of gooseneck 5. It will be noted here that most of the mechanism is located inside the said gooseneck.

Although a specific embodiment of this invention has just been described, it will be understood that various modifications may be made thereto without departing from the sipirit thereof as set forth in the appended claims.

We claim:

1. In a hitch for connecting a forward tractor and a rearward trailer together wherein said tractor has a hitch member including a gooseneck at the rear end thereof; complementary coupling means at the lower end of said gooseneck and the forward end of said trailer for coupling said gooseneck and trailer together, said coupling means comprising:

(a) a longitudinal projection at the forward end of said trailer;

(b) an open-bottom guiding channel at the lower end of said gooseneck for the guiding of said trailer projection during hitching of said gooseneck and trailer;

(c) complementary interlocking and pivoting means at the gooseneck lower end and the trailer front end allowing interlocking upon raising of said gooseneck and trailer and relative pivoting of said gooseneck and trailer, when interlocked, about a transverse axis across the rear of said channel and of said projection;

(d) a supporting member for said projection mounted on said gooseneck and movable in and out of position across the open bottom of said guiding channel; and (e) power operated ground engaging hoist means mounted to lift and lower said gooseneck, whereby said projection is first guided into said channel and said interlocking means engaged upon said hoist means raising said gooseneck while said projection is pivoted inside said channel, said supporting member is moved across the open bottom of said channel and said hoist means then lowers said gooseneck to force said projection to sit on said supporting member.

2. In a hitch for connecting a forward tractor and a rearward trailer together wherein said tractor has a hitch member including a gooseneck at the rear end thereof, complementary coupling means at the lower end of said gooseneck and the forward end of said trailer for coupling said gooseneck and trailer together, said coupling means comprising:

(a) a pair of transversely spaced projections longitudinally extending from the forward end of said trailer;

(b) a pair of open-bottom guiding channels projecting from the lower end of said gooseneck for the guiding of said trailer projections during hitching of said gooseneck and trailer;

(c) complementary interlocking and pivoting means at the gooseneck lower end and the trailer front end allowing interlocking upon raising of said gooseneck and trailer and relative pivoting of said gooseneck and trailer, when interlocked, about a transverse axis across the rear of said channels and of said projections;

(d) supporting members for said projections mounted on said gooseneck and movable in and out of position across the open bottoms of said guiding channels, and (e) power operated ground engaging hoist means mounted to lift and lower said gooseneck, whereby said projections are first guided into said channels and said interlocking means engaged upon raising of said gooseneck while said projections are pivoted upwardly, said supporting members are moved across the open bottoms of said channels and said hoist means then lowers said gooseneck to force said projections to sit on said supporting members.

3. Coupling means as claimed in claim 1, wherein said supporting members are the shoes of stirrup members the lateral straps of which are pivotally mounted on parallel cheek plates depending from said gooseneck and defining said channels.

4. Coupling means as claimed in claim 2, wherein said interlocking and pivoting means comprises transverse pins at the lower end of said gooseneck and downwardly projecting hooks formed on said trailer front end and engageable over said pins to be lifted thereby when said gooseneck is lifted.

5. In a hitch for connecting a forward tractor and a rearward trailer together wherein said tractor has a hitch member including a gooseneck at the rear end thereof; complementary coupling means at the lower end of said gooseneck and the forward end of said trailer for coupling said gooseneck and trailer together, said coupling means comprising:

(a) a pair of transversely spaced projections longitudinally extending from the forward end of said trailer; each projection being formed, at the forward free end thereof, with a downwardly protruding ledge;

(b) two pairs of parallel cheek plates depending from said gooseneck and disposed to define guiding channels each for one of said projections;

(c) complementary interlocking and pivoting means at the gooseneck lower end and the trailer front end allowing interlocking upon raising of said gooseneck and trailer, when interlocked, about a transverse axis across the rear of said channels and of said projections;

(d) stirrup members each formed with a supporting central shoe and lateral straps;

(e) means pivotally mounting the free ends of each stirrup member on the cheek plates of one channel to allow movement of the supporting shoe thereof in and out of position across the lower open end of said one channel;

(f) power operated ground engaging hoist means mounted to lift and lower said gooseneck, whereby said projections are first guided into said channels and said interlocking means are engaged upon raising of said gooseneck while said projections are pivoted upwardly with said stirrup shoes away from the lower open end of said channels, and (g) actuating means operable to pivot said stirrup members to move said shoes across the lower open end of said channels whereby said projections may be lowered to rest thereon with the ledges standing forwardly of the shoes to prevent accidental slipping of the projections from the shoes.

6. Coupling means as claimed in claim 5, wherein said interlocking and pivoting means comprises transverse pins at the lower end of said gooseneck and downwardly projecting hooks formed on said trailer front end and engageable over said pins to be lifted thereby when said gooseneck is lifted.

7. Coupling means as claimed in claim 5, wherein said gooseneck has a nose portion jutting rearwardly thereof and over the front part of said trailer in hitched condition of said tractor and trailer; a filler block slidable along said nose portion to be positioned between said trailer front part and said gooseneck nose portion, and means sliding said block into said position only after said projections sit on said stirrups.

8. Coupling means as claimed in claim 7, wherein said block moving means are rigid links connecting the said blocks to said lateral straps of said stirrup members.

References Cited

UNITED STATES PATENTS

| 2,545,584 | 3/1951 | Meadows | 280—425 |
| 2,822,945 | 2/1958 | Duffy | 280—423 |
| 2,895,746 | 7/1959 | Swaney | 280—423 |
| 3,027,030 | 3/1962 | Duffy | 280—423 |
| 3,066,954 | 12/1962 | Brockman | 280—423 |

FOREIGN PATENTS

| 778,055 | 7/1957 | Great Britain. |
| 901,241 | 7/1962 | Great Britain. |

LEO FRIAGLIA, *Primary Examiner.*